US012801945B2

(12) United States Patent
Sharpe

(10) Patent No.: US 12,801,945 B2
(45) Date of Patent: Nov. 17, 2026

(54) COMPUTER-BASED SYSTEMS CONFIGURED TO RESOLVE WEAK LABELING FOR ENTITY RESOLUTION THROUGH NEAREST NEIGHBOR AND METHODS OF USE THEREOF

(71) Applicant: Capital One Services, LLC, McLean, VA (US)

(72) Inventor: Samuel Sharpe, Cambridge, MA (US)

(73) Assignee: Capital One Services, LLC, McLean, VA (US)

( * ) Notice: Subject to any disclaimer, the term of this patent is extended or adjusted under 35 U.S.C. 154(b) by 667 days.

(21) Appl. No.: 18/343,110

(22) Filed: Jun. 28, 2023

(65) Prior Publication Data

US 2025/0005383 A1 Jan. 2, 2025

(51) Int. Cl.
*G06N 5/022* (2023.01)

(52) U.S. Cl.
CPC .................................... *G06N 5/022* (2013.01)

(58) Field of Classification Search
None
See application file for complete search history.

(56) References Cited

U.S. PATENT DOCUMENTS 9,535,902 B1 1/2017 Michalak et al.
11,301,495 B2 4/2022 Salmanson et al.
2021/0303638 A1* 9/2021 Zhong .................. G06F 18/231
2024/0220511 A1* 7/2024 Shukla .................. G06F 16/285
2024/0378492 A1* 11/2024 Raghavan .............. G06N 20/00

* cited by examiner

*Primary Examiner* — Samuel D Fereja
(74) *Attorney, Agent, or Firm* — GREENBERG TRAURIG, LLP

(57) ABSTRACT

In some embodiments, the present disclosure provides an exemplary method resolving weak labeling of entity records that may include steps of retrieving a plurality of entity records, processing the plurality of entity records with a natural language processing model, classifying by a similarity measure the plurality of entity records, determining embeddings of the entity records, determining feature groups based on a clustering model, determining a search space group rule based on at least one feature of feature groups that is determined to reduce the search space of combinations for weak labeling and merging the resolved plurality of entity records.

20 Claims, 4 Drawing Sheets

COMPUTER-BASED SYSTEMS CONFIGURED TO RESOLVE WEAK LABELING FOR ENTITY RESOLUTION THROUGH NEAREST NEIGHBOR AND METHODS OF USE THEREOF

FIELD OF TECHNOLOGY

The present disclosure generally relates to computer-based systems configured to refine weak labeling of entity records utilizing a natural language machine learning model and k nearest neighbors' model to reduce the search space for weak labeled entity records and merging entity records having similar features and methods of use thereof.

BACKGROUND OF TECHNOLOGY

Entity resolution in large databases is a difficult problem. Typically, businesses collect information about entities for a variety of reasons, for example to map out customer bases, determine potential partnerships, determine business structure etc. Information about entities, often referred to as an entity record exists in many formats and may be retrieved from many different sources. This dataset diversity inherently has a certain degree of noise associated with it. The noise can be in the form of multiple versions of the same entity record, formatting issues, incorrectly input entries of an entity record, outdated entity record data, emoji or characters instead of text, white space, capitalization, misspellings etc. This noise is typically referred to as a "weak labeling" problem. To solve this problem, typically, engineers try to define a set of rules utilizing fuzzy logic to resolve the "weak labeling" problem, but the datasets are too large, and the weakly labeled datasets cannot be refined by a finite set of rules.

SUMMARY OF DESCRIBED SUBJECT MATTER

In some embodiments, the present disclosure provides an exemplary technically improved computer-implemented method that includes at least the following steps: receiving, by at least one processor, a plurality of entity record datasets associated with one more entities, where each entity record dataset includes at least one thousand data elements; utilizing, by the at least one processor, a computer-implemented merge module to resolve a candidate entity record from a plurality of entity record datasets; where the computer-based merge module is configured to utilize at least one trained language learning model to determine a set of embeddings for the plurality of entity record datasets; determining, by the at least one processor, a classification of the set of embeddings based on at least one similarity measure; where the at least one similarity measure is utilized to determine: a set of low similarity embeddings associated with the classification of the embeddings; utilizing, by the at least one processor, a clustering engine to form a set of low similarity feature groups from at least the set of low similarity embeddings group; determining, by the at least one processor, at least one search space group rule based on the low similarity feature groups; utilizing, by the at least one processor, the search space group rule to eliminate at least one entity record from the plurality of entity records datasets; merging, by the at least one processor, the plurality of entity record datasets.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
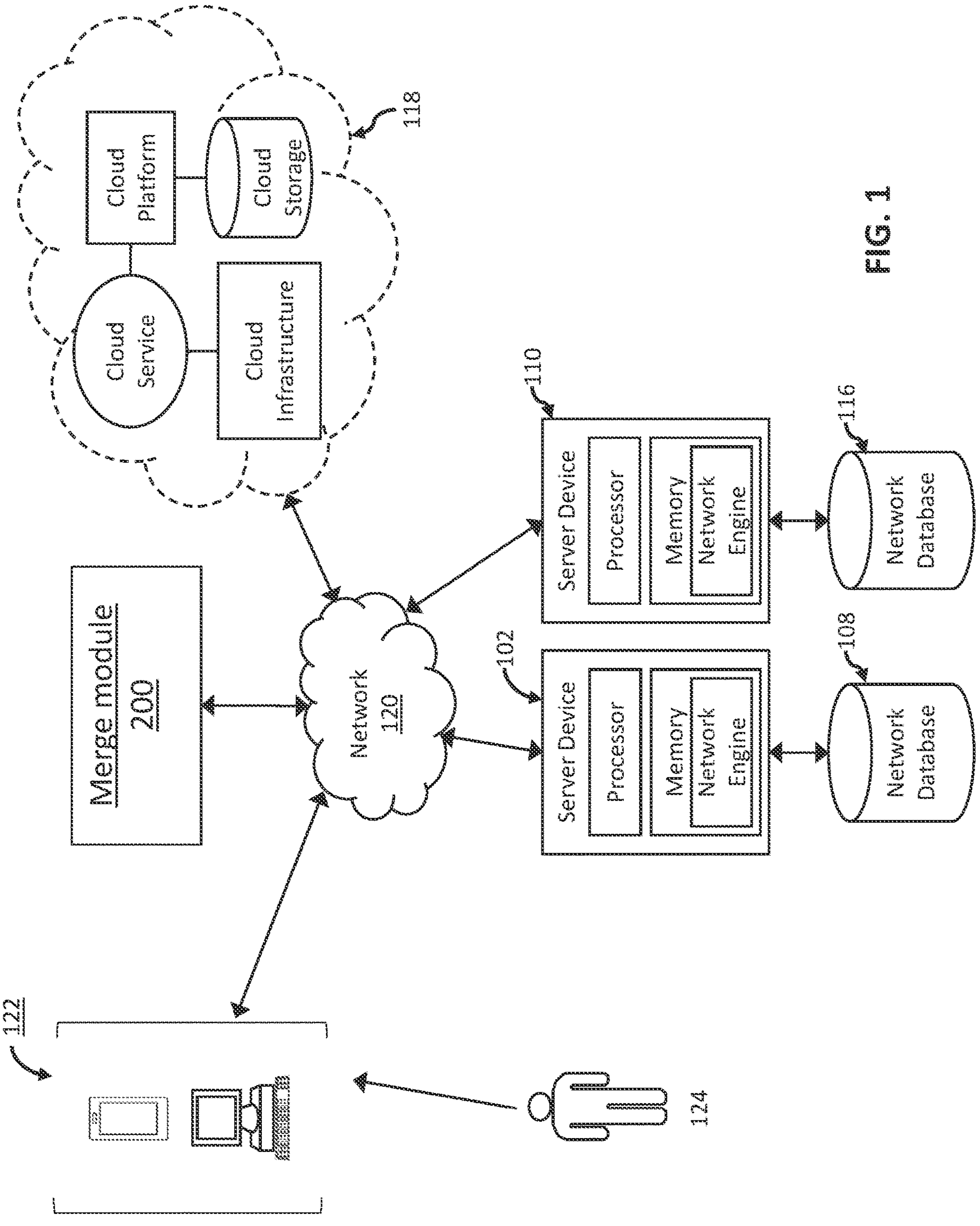
FIG. 1 depicts an illustration of an exemplary computer-based system and platform configured to refine weak labeling of entity records and merge entity records, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

A typical business determines a market for its' product or service by researching and refining potential and existing customers/client data. Customer/client data is often referred to as an entity record. In order to successfully determine a market then, a business is tasked with determining an accurate representation of an entity record. However, the number of entity records pertaining to potential and existing entity record data is astronomical.

The astronomical number of entity records also presents technical and resource problems. In the case where a business utilizes a computer-based approach to solve this issue, currently available software and systems are not capable of efficiently resolving such an intractable problem. Businesses have limited resources in terms of processing power, network, and storage limitations. In the case where a business utilizes a manual process, such as human-refined data sets and rules, the cost is exponentially prohibitive, time consuming, costly and the resulting product is often plagued with inaccuracies.

A primary problem in entity resolution is that each entity in a database may have multiple entries in a database (e.g., duplicates). The duplicate entries may share many similarities in terms of their elements, but in some cases, the entries for one entity may be very dissimilar or have unusual entry patterns usually referred to as a "weak labeling" problem. Weak labeling is typically defined as labeling that has some degree of noise associated with it. As an example, an accurate business name of an entity record may be "All Smiles Salon", however the business name may appear as ":) Salon" or "Smile :) Salon" in different databases. Each of these entity records reflect the same business name but would most likely be determined as unique entity records. Current methods of entity record resolution would not be able to resolve these records.

Current methods of entity record resolution approach this problem by defining a set of rules based on similarities/dissimilarities, however weak labeling presents an intractable problem that quickly becomes an N×N quadratic combination. Thus, refining/resolving entity records is a difficult problem. Accordingly, a solution is required that reduces the number of possible combinations of entity records and enables the refinement of the set of rules associated with the entity record datasets.

This disclosure contemplates a system that utilizes at least one natural language processing model and at least one clustering model to reduce the search space of combinations for weak labeling of a plurality of entity records from an entity record dataset having at least one thousand data elements.

In some embodiments, the present disclosure may utilize the at least one natural language processing model to automatically determine embeddings of a plurality of entity records. The at least one natural language processing model may operate on an illustrative merge module that includes one or more sub engine(s) for processing entity records. The at least one natural language processing model may be configured to resolve entity records of a dataset independently and may be communicatively coupled to at least one processor, at least one memory, at least one storage device.

In some embodiments, the illustrative merge module may be configured with at least one natural language processing model. The merge module may be configured to retrieve a plurality of entity records from a network, a server device, a network database, a cloud platform, a virtual network or any similar computer-based system capable of storing entity records.

In some embodiments, the illustrative merge module may be configured to operate with one or more sub engine(s) communicatively coupled by at least one bus to at least one processor(s), at least one storage device, at least one system memory (RAM), at least one ROM, at least one network interface, at least one output device interface (e.g., monitor), at least one input device interface (e.g., mouse, keyboard, touch sensitive display, etc.).

In some embodiments, the illustrative merge module having at least one natural language processing engine(s) may be configured with at least one sub engine(s) capable of resolving entity record datasets. The natural language processing engine of the illustrative merge module may be capable of determining embeddings of the plurality of entity record datasets. The natural language processing module may utilize at least one processor to determine a classification of the embeddings. The classification of the embeddings may be determined by a similarity measure such as hamming distance or Euclidean distance, or any type of measure that is capable of determining a classification of the embeddings.

In some embodiments, the illustrative merge module may have at least one computer accessing at least one database and may be in communication with at least one network, where the network may provide a connection between a plurality of devices, the manner in which the network connection is made may include any of a telephone line, a dial-up connection through a modem of a computing device, a wireless connection (e.g., WAN, LAN) a fiber optic connection, or a satellite connection or any number of devices capable of providing a digital or analog connection. In some embodiments, the network may also be in communication with a cloud computing platform providing connectivity to the at least one computer. In some embodiments, the network may be in communication with an illustrative computer-based merge module providing connectivity to the at least one computer. In some embodiments, the illustrative computer-based merge module may be configured to operate in the cloud platform, the computing system, or any plurality of devices capable of carrying out the operations of the illustrative computer-based merge module.

In some embodiments, the at least one NLP engine(s) of the illustrative merge module may utilize at least one piece of data from the plurality of entity record datasets to determine a classification. The NLP engine(s) may determine a classification by business name of an entity record for example "All Smiles Salon". In some embodiments, the NLP engine(s) may classify "All Smiles Salon" as a part of the classification of "Salon". The NLP engine(s) of the illustrative merge module may sort the embeddings of the classifications into at least one set. The NLP engine(s) of the illustrative merge module may determine a plurality of sets such as a set of high similarity embeddings, a set of mid-similarity embeddings, and a set of low similarity embeddings based on a similarity measure such as hamming distance or Euclidean distance.

In some embodiments the at least one NLP engine(s) of the computer-based merge module may be at least one natural language processing engine(s), the engine may be based on a deep learning architecture and may include at least one input layer, at least one hidden layer, and at least one output layer receiving the at least one deep machine learning engine processing as input of an entity record. The at least one NLP engine(s) processing through a numerical optimization of weights and connections of the at least one hidden layer derives an output layer representing embeddings of the input of the plurality of entity records.

In some embodiments, the illustrative merge module may be configured with a clustering engine sub-module capable of determining a plurality of feature groups of the embeddings utilizing a clustering model. The clustering engine is not limited to any one particular model but may be configured to utilize a k-means model, a mean-shift model, a density-based spatial clustering with noise model, an expectation-maximization clustering using gaussian mixture models, or an agglomerative hierarchical clustering model. The clustering engine, utilizing at least one processor, may be capable of forming a set of feature groups from at least the first set of high similarity embeddings group. The clustering engine, utilizing at least one processor, may be capable of forming a set of feature groups from at least the second set of mid-similarity embeddings group. The clustering engine, utilizing at least one processor, may be capable of forming a set of feature groups from at least the third set of low similarity embeddings group.

In some embodiments, the at least one clustering engine of the illustrative merge module may determine a vector quantization of the plurality of feature groups from the plurality of similarity embeddings groups. The at least one clustering engine may be capable of partitioning n observations of similarity groups into k clusters in which each observation of the features of the similarity groups belongs to a cluster with the nearest mean or centroid.

In some embodiments, the at least one clustering engine of the illustrative merge module may determine from the set of low similarity feature groups at least one search space group rule based on the plurality of features of the low similarity feature groups. In some embodiments, the at least one clustering engine of the illustrative merge module may determine from the set of mid-similarity feature groups at least one search space group rule based on the plurality of features of the mid-similarity feature groups. In some embodiments, the at least one clustering engine of the illustrative merge module may determine from the set of high similarity feature groups at least one search space group rule based on the plurality of features of the high similarity feature groups.

In some embodiments the at least one clustering engine of the illustrative merge module may determine a search space group rule by utilizing a vector based measure such as hamming distance or Euclidean distance to determine a distance between features of the low similarity feature groups. The clustering engine is not limited to utilizing a vector-based distance measure but may utilize any type of measure capable of determining a distance between the low similarity feature groups. The clustering engine may apply a threshold to a distance between the vector based measure of the similarity feature groups to determine at least one search space group rule.

In some embodiments, the at least one clustering engine of the illustrative merge module may utilize the search space group rule to eliminate at least one entity record from the plurality of entity record datasets. As detailed above, the clustering engine of the illustrative merge module may determine a search space group rule that for example the emoji contained in entity name "Smiley :) Salon" belongs to one of the plurality of low similarity features. The clustering engine of the illustrative merge module may determine a search space group rule that eliminates any entity record from the plurality of entity record datasets that includes an emoji based on a distance measure such as hamming distance or Euclidean distance or any other measure capable of determining a distance between the entity record datasets having low similarity and the plurality of entity record datasets.

In some embodiments, the at least one clustering engine of the illustrative merge module may utilize the clustering neighbors' model to form a set of low similarity feature groups from the similarity embeddings group. The clustering engine may determine at least one search space group rule based on the high similarity feature groups. The search space group rule may utilize a distance measure such as hamming distance or Euclidean distance to determine a distance between the high similarity entity records. The clustering engine may utilize the search space group rule to eliminate at least one of the high similarity entity records from the plurality of entity record datasets. In some embodiments, a merge engine may determine a merge of the high similarity entity records based on the search space group rule.

FIG. 1 depicts an illustration of an exemplary computer-based system and platform configured to refine weak labeling of entity records and merge entity records, in accordance with one or more embodiments of the present disclosure.

In some embodiments of the present disclosure in FIG. 1 may include an illustrative computer-based merge module 200. The illustrative merge module 200 may operate independently, or it may be configured to operate on a cloud platform 118, a server device 102 accessing a database 108, a server device 110 accessing a network database 116, as a virtual machine in a network 120 or a computing device(s) 122. In some embodiments, the illustrative computer-based merge module 200 is accessible to a user 124 through a computing device(s) 122.

In some embodiments, referring to FIG. 1, computing device(s) 122 of the exemplary computer-based system and platform may include virtually any computing device capable of receiving and sending a message over a network (e.g., cloud network), such as network 120, to and from another computing device, such as servers 102 and 110, each other, and the like. In some embodiments, the computing device(s) 122 may be personal computers, multiprocessor systems, microprocessor-based or programmable consumer electronics, network PCs, and the like. In some embodiments, one or more client devices within computing device(s) 122 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more client devices within computing device(s) 122 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more client devices within computing device(s) 122 may include may run one or more applications, such as Internet browsers, mobile applications, voice calls, video games, videoconferencing, and email, among others. In some embodiments, one or more client devices within computing device(s) 122 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within computing device(s) 122 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a client device may periodically report status or send alerts over text or email. In some embodiments, a client device may contain a data recorder which is remotely downloadable by the user using network protocols such as FTP, SSH, or other file transfer mechanisms. In some embodiments, a client device may provide several levels of user interface, for example, advance user, standard user. In some embodiments, one or more client devices within computing device(s) 122 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 122 may provide network access, data transport and/or other services to any computing device coupled to it. In some embodiments, the exemplary network 122 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 122 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 122 may include and implement, as an alternative or in conjunction with one or more of the above, a WiMAX architecture defined by the WiMAX forum. In some embodiments and, optionally, in combination of any embodiment described above or below, the exemplary network 122 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 122 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 122 may also include mass storage, such as network attached storage (NAS), a storage area network (SAN), a content delivery network (CDN) or other forms of computer or machine readable media.

In some embodiments, the exemplary server device 102 or the exemplary server device 110 may be a web server (or a series of servers) running a network operating system, examples of which may include but are not limited to Apache on Linux or Microsoft IIS (Internet Information Services). In some embodiments, the exemplary server device 102 or the exemplary server device 110 may be used for and/or provide cloud and/or network computing. Although not shown in FIG. 1, in some embodiments, the exemplary server device 102 or the exemplary server device 110 may have connections to external systems like email, SMS messaging, text messaging, ad content providers, etc. Any of the features of the exemplary server device 102 may be also implemented in the exemplary server device 110 and vice versa.

In some embodiments, one or more of the exemplary server devices 102 and 110 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the computing device(s) 122.

In some embodiments and, optionally, in combination of any embodiment described above or below, for example, one or more exemplary computing device(s) 122, the exemplary server device 102, and/or the exemplary server device 110 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

According to some embodiments of the exemplary implementations of the cloud platform 118 of FIG. 1 depict exemplary inventive computer-based systems/platforms, the exemplary inventive computer-based devices, and/or the exemplary inventive computer-based components of the present disclosure may be specifically configured to operate. In some embodiments the cloud platform 118 illustrates an exemplary system specifically configured to operate in a cloud platform such as, but not limiting to: infrastructure as a service (IaaS), platform as a service (PaaS), and/or software as a service (SaaS).

Figure 2:
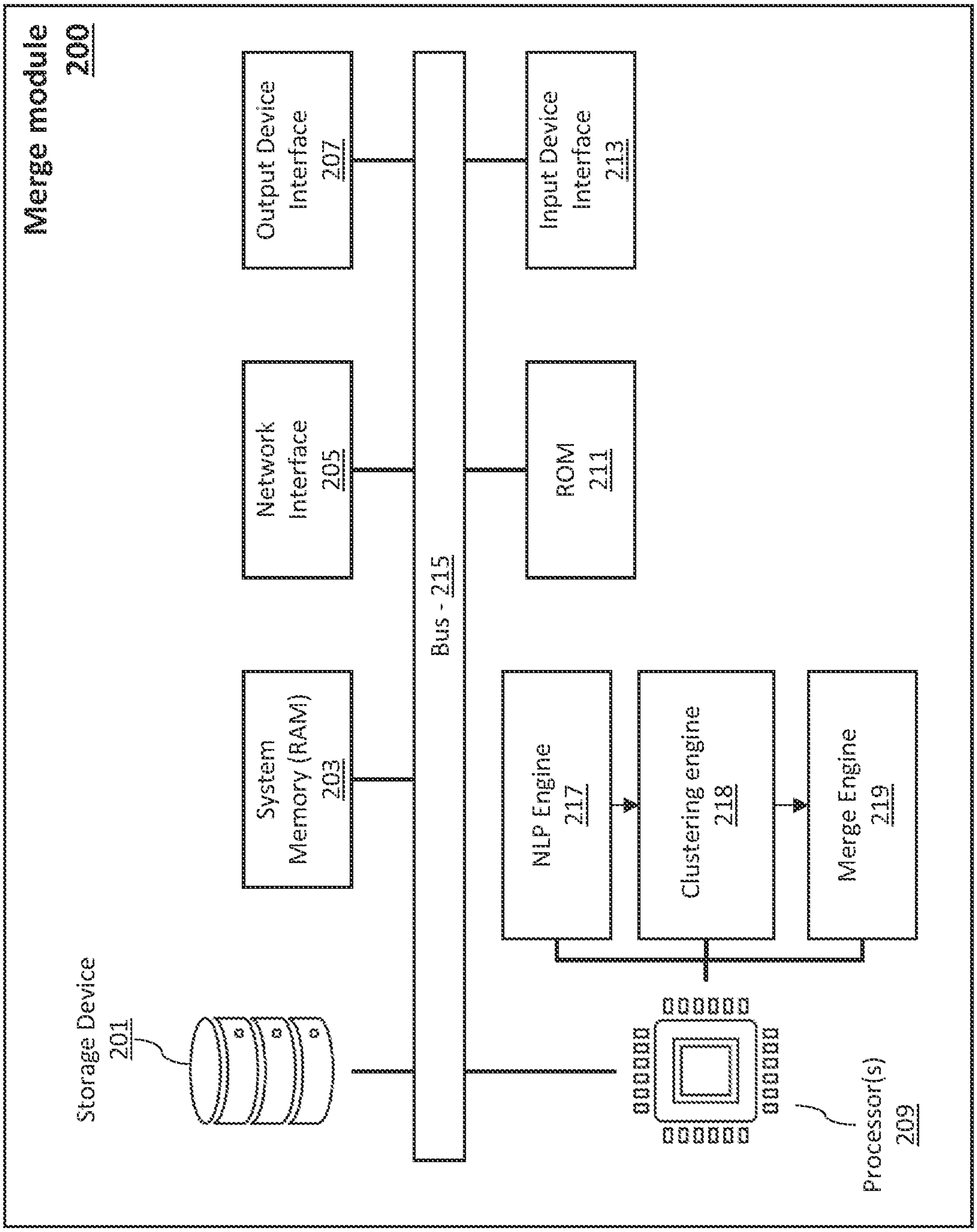
FIG. 2 depicts a block diagram of an exemplary computer-based merge module for refining weak labeled entity records in an entity record database in accordance with one or more embodiments of the present disclosure.

FIG. 2 depicts a block diagram of an exemplary computer-based merge module 200 for refining weak labeled entity records in an entity record database in accordance with one or more embodiments of the present disclosure.

FIG. 2 depicts an exemplary block diagram of a computer-based merge module 200 and sub engine(s) according to some embodiments. The computer-based monitoring module 200 of FIG. 2 is a non-limiting example of a system capable of storing and processing at least one deep machine learning algorithm capable of natural language processing for resolving entity records of a plurality of entity record datasets. In some embodiments, the computer-based merge module 200 having a network interface 205 communicatively coupled to a bus 215 capable of transmitting data entity record data, at least one input device interface 213 (e.g., keyboard, mouse) for inputting information, at least one output device interface 207 (e.g., screen) for viewing the output, at least one system memory (RAM) 203 and at least one ROM 211 for storing access memory, at least one storage device 201 for storing a plurality of entity record datasets, at least one natural language processing engine 217, at least on clustering engine 218, and a merge engine 219 communicatively coupled to the at least one processor(s) 209. In some embodiments the storage device 201 stores a plurality of entity record datasets having at least one thousand data elements.

In some embodiments, the NLP engine 217 of FIG. 2 of the present disclosure, NLP engine(s) of the illustrative computer-based merge module may utilize at least one data entry from the plurality of entity record datasets to determine a classification of the datasets. The NLP engine 217 communicatively coupled by bus 215 may retrieve an entity record dataset utilizing processor(s) 209 from storage device 201 to determine a classification of an entity record dataset. In some embodiments, the NLP engine 217 may determine a classification by business name of an entity record for example a data entry of an entity record dataset may contain the text “Mid-Town Computer Repair”. In some embodiments, the NLP engine 217 may classify “Mid-Town Computer Repair” as a part of the classification of “Computer Repair”. The NLP engine 217 of the illustrative merge module 200 may sort the embeddings of the classifications into at least one set. The NLP engine 217 of the illustrative merge module may determine a plurality of sets such as a set of high similarity embeddings, a set of mid-similarity embeddings, and a set of low similarity embeddings based on a similarity measure such as hamming distance or Euclidean distance.

In some embodiments the at least one NLP engine 217 of the computer-based merge module may be natural language processing engine(s), the engine may be based on a deep learning architecture. The NLP engine 217 may include at least one input layer, at least one hidden layer, and at least one output layer receiving the at least one deep machine learning engine processing as input a plurality of entity record datasets retrieved from storage device 201. The at least one NLP engine 217 utilizing the at least one processor(s) 209 processing through a numerical optimization of weights and connections of the at least one hidden layer deriving an output layer representing embeddings of the input of the plurality of entity records. In some embodiments, the NLP engine 217 may be trained by first randomizing the weights of the network, make a set of predictions on which subset of entity records belongs to which classification with forward-propagation, compute a corresponding cost function, and update each weight by an amount proportional to the cost function.

In some embodiments, the illustrative computer-based merge module 200 may include at least one clustering engine 218 for determining feature groups of the embeddings utilizing a clustering neighbors' model. The illustrative computer-based merge module 200 may utilize the processor(s) 209 to determine a vector quantization of the plurality of feature groups from the plurality of similarity embeddings groups determined by the NLP engine 217. The at least one clustering engine 218 utilizing the processor(s) 209 may determine clusters of feature groups by partitioning n observations of similar feature groups into k clusters in which each observation of the features of the similar groups belongs to a cluster with the nearest mean or centroid.

In some embodiments, the clustering engine 218 of the illustrative computer-based merge module 200 may apply a pre-defined threshold to the feature groups to determine a similarity between groups and may define a number of groups. The pre-defined threshold may be correlation based and may be determined by any type of correlative measure such as for example regression based measure utilizing a standard deviation.

In some embodiments, the clustering engine 218 of the illustrative computer-based merge module 200 may utilizing, at least one processor(s) 209, be capable of forming a set of feature groups from a first set of high similarity embeddings group. The clustering engine 218 of the illustrative computer-based merge module 200 may utilize the merge engine 219 to merge the entity record datasets having a high similarity embedding as the high similarity embeddings are likely the same entity record. The clustering engine 218 utilizing, at least one processor, may be capable of forming a set of feature groups from at least a set of mid-similarity embeddings group. The clustering engine 218 utilizing, at least one processor, may be capable of forming a set of feature groups from at least a set of low similarity embeddings group. The clustering engine 218 is not limited to determine a plurality of embeddings groups but may be configured to determine at least one set of similar embeddings group.

In some embodiments the at least one clustering engine 218 of the illustrative computer-based merge module 200 utilizing the at least one processor(s) 209 may determine a search space group rule from the at least one similar embeddings group. The search space group rule may define a rule for resolving an entity record from a plurality of entity record datasets. For example, the rule may determine that entity records that contain an emoji or a non-text based character is low in similarity to the feature groups of other entity record datasets. The search space group rule then may eliminate entity records from the plurality of entity record datasets that contain an emoji, or non-text based character.

In some embodiments, the clustering engine 218 of the illustrative computer-based merge module 200 may determine a search space group rule by utilizing a vector based measure such as hamming distance or Euclidean distance to determine a distance between features of the low similarity feature groups. The clustering engine is not limited to utilizing a vector-based distance measure but may utilize any type of measure capable of determining a difference between similar feature groups. The clustering engine may apply a pre-defined threshold to a distance between the vector based measure of the similarity feature groups to determine at least one search space group rule.

In some embodiments, the merge engine 219 of the illustrative computer-based merge module 200 may determine a merge of the entity record datasets based on the at least one search space group rule determined by the clustering engine 218. In some embodiments, the clustering engine 218 may be configured to determine high similarity feature group of the plurality of entity record datasets stored in storage device 201. The merge engine 219 may determine to merge the high similarity feature group entity records into a single representation of the entity record dataset. In some embodiments, the clustering engine 218 of the computer-based merge module 200 may apply a search space group rule to a plurality of entity record datasets. The search space group rule may eliminate a specific set of low similarity feature groups from the plurality of entity record datasets. In some embodiments, the merge engine 219 may be configured to merge entity record datasets that have had the low similarity feature groups eliminated by the search space group rule. The search space group rule is not limited to determining a single rule such as for example the low similarity feature groups, but may determine a plurality of rules to be applied to feature groups such as for example, misspellings, grammatical errors, miss entries, typographical errors, or any type of errors discernable from the feature groups of the embeddings.

Figure 3:
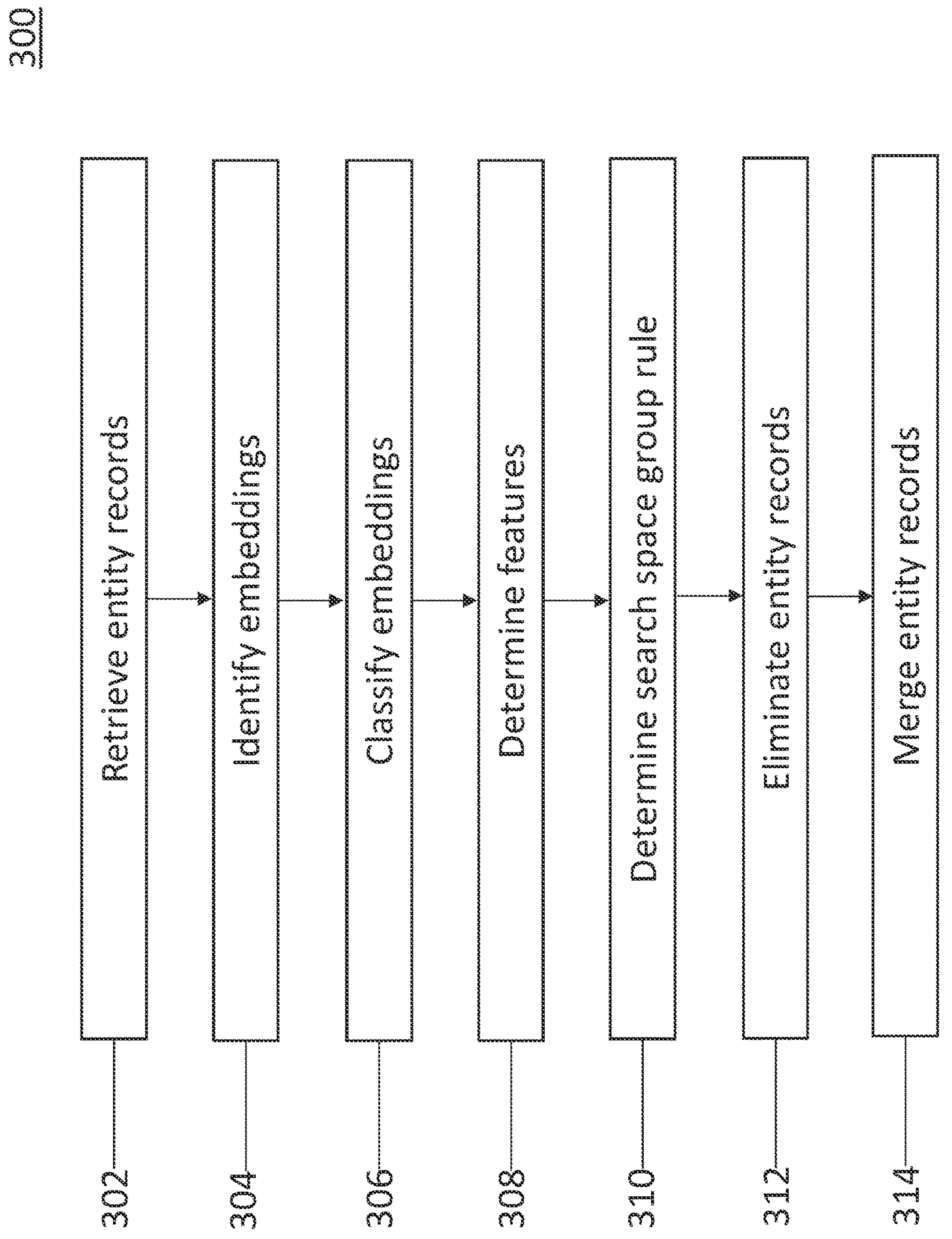
FIG. 3 is a flowchart illustrating operational steps of refining weak labeling of entity records and merging entity records, in accordance with one or more embodiments of the present disclosure.

FIG. 3 is a flowchart illustrating operational steps of refining weak labeling of entity records and merging entity records, in accordance with one or more embodiments of the present disclosure.

In Step 302, the NLP engine(s) 217 of the illustrative computer-based merge module 200 retrieves, utilizing the processor(s) 209 a plurality of entity records from the storage device 201 for executing a series of steps to resolve weak labeling in a plurality of entity record datasets. The NLP engine(s) 217 may utilize at least one natural language processing model to identify embeddings of the plurality of entity record datasets.

In step 304 in some embodiments the at least one NLP engine 217 of the computer-based merge module 200 may identify the embeddings of the plurality of entity record datasets retrieved from the storage device 201. The NLP engine 217 is not limited to but may be based on a deep learning architecture and may include at least one input layer, at least one hidden layer, and at least one output layer receiving the at least one deep machine learning engine processing as input, an entity record. The at least one NLP engine 217 utilizing the at least one processor(s) 209 processing through a numerical optimization of weights and connections of the at least one hidden layer deriving an output layer representing embeddings of the input of the plurality of entity records.

In step 306 in some embodiments the at least one NLP engine 217 of the illustrative computer-based merge module 200 utilizing the at least one processor(s) 209 determines a classification of the embeddings. In some embodiments, the NLP engine 217 may determine a classification by business name of an entity record for example a data entry of an entity record dataset may contain the text "Mid-Town Computer Repair". For example, the NLP engine 217 may classify "Mid-Town Computer Repair" as a part of the classification of "Computer Repair". The NLP engine 217 may utilize a similarity measure to determine a classification, the similarity measure may be based on for example a hamming distance or Euclidean distance or any measure capable of determining a difference between the embeddings. The NLP engine 217 of the illustrative computer-based merge module 200 may sort the embeddings of the classifications into at least one set.

In step 308 in some embodiments the clustering engine 218 of the illustrative computer-based merge module 200 utilizing the at least one processor(s) 209 may determine a set of feature groups from the plurality of the embeddings utilizing a clustering neighbors' model. The at least one clustering engine 218 utilizing the processor(s) 209 may determine clusters of feature groups by partitioning n observations of similar feature groups into k clusters in which each observation of the features of the similar groups belongs to a cluster with the nearest mean or centroid. The clustering engine 218 may utilizing the processor(s) 209 determine a set of high similarity feature groups from the plurality of feature groups. The clustering engine 218 may utilize a distance measure such as hamming distance or Euclidean distance to determine a high similarity feature group. The clustering engine is not limited to a distance measure to determine similarity but may utilize any measure capable of determining a distance between the feature groups. The clustering engine 218 utilizing the processor(s) 209 may determine a plurality of sets of similarity feature groups, for example a high similarity feature group, a mid-similarity feature group, or a low similarity feature group.

In step 310, in some embodiments, the clustering engine 218 of the illustrative computer-based merge module 200 may utilizing the processor(s) 209 determine a search space group rule from at least one of the similarity features groups. The clustering engine 218 may utilize a vector based distance measure such as hamming distance or Euclidean distance to determine the similarity feature. The clustering engine 218 utilizing the processor(s) 209 may determine a search space group rule that utilizes the merge engine 219 to merge entity records that have high similarity features. The clustering engine 218 may determine that entity records that contain substantially the same features based on at least one entry of an entity record have high similarity.

In step 312, in some embodiments the clustering engine 218 may determine a set of low similarity feature groups contain non-text character such as an emoji. The clustering engine 218 may determine a search space group rule that eliminates entity records from the plurality of entity records that contain an emoji.

In step 314, in some embodiments the merge engine 219 of the illustrative computer-based merge module 200 utilizing the at least one processor(s) 209 determines a merge of the plurality of entity records. The merge engine 219 may determine a merge of the entity record datasets based on the at least one search space group rule determined by the clustering engine 218. In some embodiments, the merge engine 219 may determine to merge the high similarity feature group entity records into a single representation of the entity record dataset. In some embodiments, the clustering engine 218 of the computer-based merge module 200 may apply a search space group rule to a plurality of entity record datasets. The search space group rule may eliminate a specific set of entity records that have low similarity feature groups from the plurality of entity record datasets.

In some embodiments, the merge engine 219 may be configured to merge entity record datasets that have had the low similarity feature groups eliminated by the search space group rule. The search space group rule is not limited to determining a single rule such as for example the low similarity feature groups, but may determine a plurality of rules to be applied to feature groups such as for example rules based on misspellings, grammatical errors, miss entries, typographical errors, or any type of errors discernable from the feature groups of the embeddings.

Figure 4:
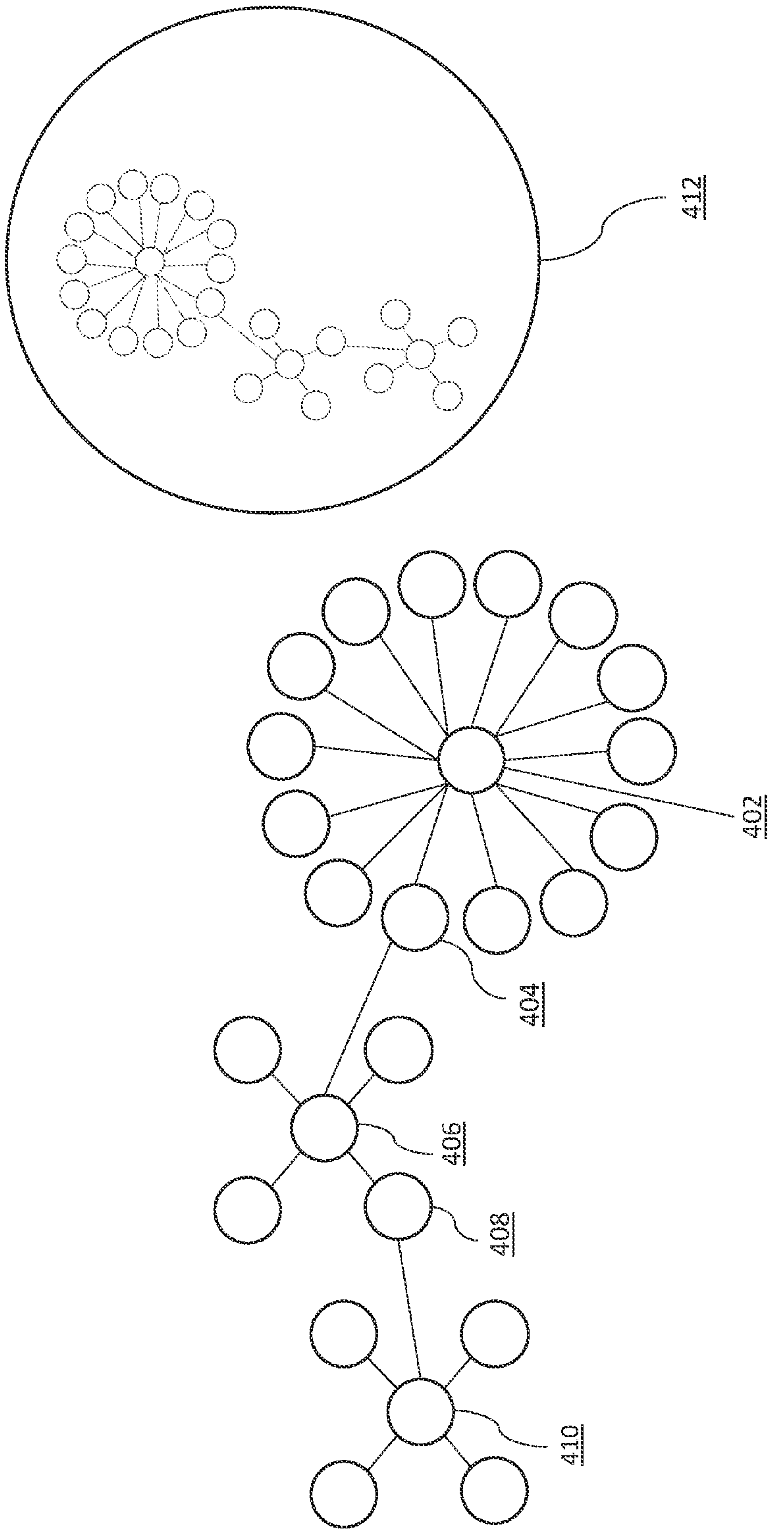
FIG. 4 is a diagram of an exemplary computer-based system for refining weak labeled entity records illustrating the nearest neighbor clustering of entity records, in accordance with one or more embodiments of the present disclosure.

FIG. 4 is a diagram of an exemplary computer-based system for refining weak labeled entity records illustrating the nearest neighbor clustering of entity records, in accordance with one or more embodiments of the present disclosure.

In some embodiments, the clustering engine 218 of the illustrative merge module 200 utilizing the at least one processor(s) 209 may determine a plurality of similarity feature groups between entity record 402, entity record 404, entity record 406, entity record 408, and entity record 410. The clustering engine 218 may determine a plurality of similarity feature groups from the plurality of entity record datasets such as the similarity feature group 412. The clustering engine 218 may determine utilizing a distance measure a first set of similarity feature groups signified by nodes connected by edges to entity record 402. In some embodiments, nodes directly connected to entity record 402 may have been determined to be a high similarity feature group, each edge connecting the nodes may reflect a distance to entity record 402. In some embodiments the distance measure may be a vector based measure such as hamming distance or Euclidean distance or any measure capable of discerning a difference between similarity feature groups.

In some embodiments, clustering engine 218 of the illustrative computer-based merge module 200 utilizing the at least one processor(s) may determine a mid-similarity feature group including entity record 406. The mid-similarity feature group including entity record 406 may be determined to have a similarity feature to entity record 404. The mid-similarity feature group including a set of nodes connected by edges may be determined to share a similarity feature with entity record 406, for example, entity record 406 may share the same classification with entity record 402 and shares a stronger similarity feature as determined by a distance measure with entity record 404, than any other node belonging to the high similarity feature group.

In some embodiments, clustering engine 218 of the illustrative computer-based merge module 200 utilizing the at least one processor(s) may determine a low similarity feature group including entity record 410. The low similarity feature group including entity record 410 may be determined to share a similarity feature to entity record 408. Similar to the mid-similarity feature group, the low similarity feature group shares a similarity feature with entity record 402 as in a classification feature and shares a stronger similarity feature to entity record 408 than for example, entity record 404.

In some embodiments, the clustering engine 218 of the illustrative computer-based merge module 200 utilizing the at least one processor(s) 209 may determine a search space group rule based on the entity record 410. The clustering engine 218 may determine the low similarity feature group including entity record 410 may contain a non-text character such as an emoji or punctuation mark. The clustering engine 218 may determine a rule to eliminate a plurality of entity records determined to contain an emoji or punctuation mark such as the low similarity feature group including entity record 410.

In some embodiments, the clustering engine 218 of the illustrative computer-based merge module 200 utilizing the at least one processor(s) 209 may determine a search space group rule for merging a set of high similarity feature groups including and directly connected by edges to entity record 402. In some embodiments, merge engine 219 may determine a merge of the entity records depicted as nodes connected by edges to entity record 402 into one entity record.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or automatically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a creator interacting with an application on a mobile device) occurs, in order that results of the computation can be used in guiding the physical process.

As used herein, the term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). The aforementioned examples are, of course, illustrative and not restrictive.

As used herein, the terms "virtual machine (VM)" identifies at least one software component and/or a combination of at least one software component and at least one hardware component which are designed/programmed/configured to virtually emulate physical computer systems, such as, e.g., system virtual machines that provide a virtualization of a physical machine, a process virtual machine that is designed to execute computer programs in a virtual environment, or other duplication of real computing systems in a virtual environment.

Herein, the term "database" and "dataset" refers to an organized collection of data, stored, accessed or both electronically from a computer system. The database may include a database model formed by one or more formal design and modeling techniques. The database model may include, e.g., a navigational database, a hierarchical database, a network database, a graph database, an object database, a relational database, an object-relational database, an entity-relationship database, an enhanced entity-relationship database, a document database, an entity-attribute-value database, a star schema database, or any other suitable database model and combinations thereof. For example, the database may include database technology such as, e.g., a centralized or distributed database, cloud storage platform, decentralized system, server or server system, among other storage systems. In some embodiments, the database may, additionally or alternatively, include one or more data storage devices such as, e.g., a hard drive, solid-state drive, flash drive, or other suitable storage device. In some embodiments, the database may, additionally or alternatively, include one or more temporary storage devices such as, e.g., a random-access memory, cache, buffer, or other suitable memory device, or any other data storage solution and combinations thereof.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) define Neural Network architecture/model,
ii) transfer the input data to the exemplary neural network model,
iii) train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, data entries may be matched according to a measure of similarity of individual or combinations of attributes represented in the data entries. In some embodiments, the measure of similarity may include, e.g., an exact match or a predetermined similarity score according to, e.g., Jaccard similarity, Jaro-Winkler similarity, Cosine similarity, Euclidean similarity, Overlap similarity, Pearson similarity, Approximate Nearest Neighbors, K-Nearest Neighbors, among other similarity measure. The predetermined similarity score may be any suitable similarity score according to the type of electronic activity to identify a measured attribute of any two data entries as the same.

In some embodiments, similarity may be measured between each individual attribute separately, and the respective similarity scores summed, averaged, or otherwise combined to produce a measure of similarity of two data entries. In some embodiments, the similarity may instead or in addition be measured for a combination of the device identifier, device type identifier and location identify. For example, a hash or group key may be generated by combining the device identifier, device type identifier and location identify. The hash may include a hash functioning take as input each of attribute or a subset of attributes of a particular data entry. The group key may be produced by creating a single string, list, or value from combining each of, e.g., a string, list or value representing each individual attribute of the particular data entry. The similarity between two data entries may then be measured as the similarity between the associated hashes and/or group keys. The measured similarity may then be compared against the predetermined similarity score to determine candidate data entries that are candidates as matching to each other.

In some embodiments and, optionally, in combination of any embodiment described above or below, the computer-based merge module 200 having at least one deep machine learning sub-module may specify a neural network by at least a neural network topology, a series of activation functions, and connection weights. The at least one deep machine learning sub-module may include a convolution neural network architecture, or any similar neural network architecture capable of determining embeddings from a plurality of entity record datasets. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer module", "module" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" may refer to a single, physical processor with associated communications and data storage and database facilities, or it may refer to a networked or clustered complex of processors and associated network and storage devices, as well as operating software and one or more database systems and application software that support the services provided by the server. In some embodiments, the server may store transactions and automatically trained deep machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that may be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile;™ (20) Microsoft DirectX™; (21) .NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the exemplary ASR system of the present disclosure, utilizing at least one deep machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent tests for software agents that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary ASR system of the present disclosure, utilizing at least one deep machine-learning model described herein, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device may include, but is not limited to, a mobile phone, Personal Digital Assistant (PDA), Blackberry™, Pager, Smartphone, or any other reasonable mobile electronic device.

The aforementioned examples are, of course, illustrative and not restrictive.

At least some aspects of the present disclosure will now be described with reference to the following numbered clauses.

Clause 1. A method may include: retrieving, by at least one processor, a plurality of entity record datasets associated with one more entities, where each entity record dataset includes at least one thousand data elements; utilizing, by the at least one processor, a computer-based merge module to resolve a candidate entity record from a plurality of entity record datasets; where the computer-based merge module is configured to utilize at least one trained language learning model to determine a set of embeddings for the plurality of entity record datasets; determining, by the at least one processor, a classification of the set of embeddings based on at least one similarity measure; where the at least one similarity measure is utilized to determine: a set of low similarity embeddings associated with the classification of the embeddings; utilizing, by the at least one processor, a clustering engine to form a set of low similarity feature groups from at least the set of low similarity embeddings group; determining, by the at least one processor, at least one search space group rule based on the low similarity feature groups; utilizing, by the at least one processor, the search space group rule to eliminate at least one entity record from the plurality of entity records datasets; merging, by the at least one processor, the plurality of entity record datasets.

Clause 2. The method according to clause 1, wherein, the at least one similarity measure is utilized to determine a set of high similarity embeddings group associated with the classification of the set of embeddings.

Clause 3. The method according to clause 2, where the clustering engine is utilized to form a set of high similarity feature groups from the set of high similarity embeddings group.

Clause 4. The method according to clause 3, where a search space group rule is determined based on the high similarity feature groups.

Clause 5. The method according to clause 4, where the search space group rule is utilized to eliminate at least one entity record from the plurality of entity record datasets.

Clause 6. The method according to clause 5, wherein, the plurality of entity record datasets are merged.

Clause 7. The method according to clause 3, where the merge module determines an entity merge based on the features of the candidate entity record and at least the set of high similarity feature groups.

Clause 8. A system may include: a non-transient computer memory, storing software instructions; and a least one processor of a first computing devices associated with a user; wherein, then at least one processor executes the software instructions, the first computing device is programmed to: retrieve, by at least one processor, a plurality of entity record datasets associated with one more entities, where each entity record dataset includes at least one thousand data elements; utilize, by the at least one processor, a computer-based merge module to resolve a candidate entity record from a plurality of entity record datasets; where the computer-based merge module is configured to utilize at least one trained language learning model to determine a set of embeddings for the plurality of entity record datasets; determine, by the at least one processor, a classification of the set of embeddings based on at least one similarity measure; where the at least one similarity measure is utilized to determine: a set of low similarity embeddings associated with the classification of the embeddings; utilize, by the at least one processor, a clustering engine to form a set of low similarity feature groups from at least the set of low similarity embeddings group; determine, by the at least one processor, at least one search space group rule based on the low similarity feature groups; utilize, by the at least one processor, the search space group rule to eliminate at least one entity record from the plurality of entity records datasets; merge, by the at least one processor, the plurality of entity record datasets.

Clause 9. The system of claim 8, where the at least one similarity measure is utilized to determine a set of high similarity embeddings group associated with the classification of the set of embeddings.

Clause 10. The system of claim 9, where the clustering engine is utilized to form a set of high similarity feature groups from at least the set of high similarity embeddings group.

Clause 11. The system of claim 10, where a search space group rule is determined based on the high similarity feature groups.

Clause 12. The system of claim 11, where the search space group rule is utilized to eliminate at least one entity record from the plurality of entity record datasets.

Clause 13. The system of claim 12, where the plurality of entity record datasets are merged.

Clause 14. The system of claim 10, where the merge module determines an entity merge based on the features of the candidate entity record and at least the set of high similarity feature groups.

Clause 15. A system may include: At least one computer-readable storage medium having encoded thereon software instructions that, when executed by at least one processor, cause the at least one processor to perform steps to: retrieve, by at least one processor, a plurality of entity record datasets associated with one more entities, where each entity record dataset includes at least one thousand data elements; utilize, by the at least one processor, a computer-based merge module to resolve a candidate entity record from a plurality of entity record datasets; where the computer-based merge module is configured to utilize at least one trained language learning model to determine a set of embeddings for the plurality of entity record datasets; determine, by the at least one processor, a classification of the set of embeddings based on at least one similarity measure; where the at least one similarity measure is utilized to determine: a set of low similarity embeddings associated with the classification of the embeddings; utilize, by the at least one processor, a clustering engine to form a set of low similarity feature groups from at least the set of low similarity embeddings group; determine, by the at least one processor, at least one search space group rule based on the low similarity feature groups; utilize, by the at least one processor, the search space group rule to eliminate at least one entity record from the plurality of entity records datasets; merge, by the at least one processor, the plurality of entity record datasets.

Clause 16. The system of claim 15, where the at least one similarity measure is utilized to determine a set of high similarity embeddings group associated with the classification of the set of embeddings.

Clause 17. The system of claim 16, where the clustering engine is utilized to form a set of high similarity feature groups from at least the set of high similarity embeddings group.

Clause 18. The system of claim 17, where a search space group rule is determined based on the high similarity feature groups.

Clause 19. The system of claim 18, where the search space group rule is utilized to eliminate at least one entity record from the plurality of entity record datasets.

Clause 20. The at least one computer-readable storage medium of claim 19, where the plurality of entity record datasets are merged.

Clause 21. The at least one computer-readable storage medium of claim 17, where the merge module determines an entity merge based on the features of the candidate entity record and at least the set of high similarity feature groups.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein may be utilized in any combination with each other. Further still, the various steps may be carried out in any desired order (and any desired steps may be added and/or any desired steps may be eliminated).

What is claimed is:

1. A computer-implemented method comprising:

receiving, by at least one processor, a plurality of entity record datasets associated with one more entities, wherein each entity record dataset comprises at least one thousand data elements;

utilizing, by the at least one processor, a computer-based merge module to resolve a candidate entity record from a plurality of entity record datasets;

wherein the computer-based merge module is configured to utilize at least one trained language learning model to determine a set of embeddings for the plurality of entity record datasets;

determining, by the at least one processor, a classification of the set of embeddings based on at least one similarity measure;

wherein the at least one similarity measure is utilized to determine:

a set of low similarity embeddings associated with the classification of the embeddings;

utilizing, by the at least one processor, a clustering engine to form a set of low similarity feature groups from at least the set of low similarity embeddings group;

determining, by the at least one processor, at least one search space group rule based on the low similarity feature groups, wherein the clustering engine determines the at least one search space group rule by identifying one or more features of the set of low similarity feature groups and applying a threshold to a distance, determined using a vector based measure, between features of the low similarity feature groups;

utilizing, by the at least one processor, the search space group rule to eliminate at least one entity record from the plurality of entity records datasets by applying the search space group rule to the plurality of entity record datasets to eliminate the at least one entity record that includes the identified one or more features of the set of low similarity feature groups;

merging, by the at least one processor, the plurality of entity record datasets.

2. The computer-implemented method of claim 1, wherein the at least one similarity measure is utilized to determine a set of high similarity embeddings group associated with the classification of the set of embeddings.

3. The computer-implemented method of claim 2, wherein the clustering engine is utilized to form a set of high similarity feature groups from the set of high similarity embeddings group.

4. The computer-implemented method of claim 3, wherein a search space group rule is determined based on the high similarity feature groups.

5. The computer-implemented method of claim 4, wherein the search space group rule is utilized to eliminate at least one entity record from the plurality of entity record datasets.

6. The computer-implemented method of claim 5, wherein the plurality of entity record datasets are merged.

7. The computer-implemented method of claim 3, wherein the merge module determines an entity merge based on the features of the candidate entity record and at least the set of high similarity feature groups.

8. A system comprising:

a non-transient computer memory, storing software instructions; and at least one processor of a first computing device associated with a user;

wherein, when at least one processor executes the software instructions, the first computing device is programmed to:

retrieve, by at least one processor, a plurality of entity record datasets associated with one or more entities, wherein each entity record dataset comprises at least one thousand data elements;

utilize, by the at least one processor, a computer-based merge module to resolve a candidate entity record from a plurality of entity record datasets;

wherein the computer-based merge module is configured to utilize at least one trained language learning model to determine a set of embeddings for the plurality of entity record datasets;

determine, by the at least one processor, a classification of the set of embeddings based on at least one similarity measure;

wherein the at least one similarity measure is utilized to determine:

a set of low similarity embeddings associated with the classification of the embeddings;

utilize, by the at least one processor, a clustering engine to form a set of low similarity feature groups from at least the set of low similarity embeddings group;

determine, by the at least one processor, at least one search space group rule based on the low similarity feature groups, wherein the clustering engine determines the at least one search space group rule by identifying one or more features of the set of low similarity feature groups and applying a threshold to a distance, determined using a vector based measure, between features of the low similarity feature groups;

utilize, by the at least one processor, the search space group rule to eliminate at least one entity record from the plurality of entity record datasets by applying the search space group rule to the plurality of entity record datasets to eliminate the at least one entity record that includes the identified one or more features of the set of low similarity feature groups;

merge, by the at least one processor, the plurality of entity record datasets.

9. The system of claim 8, wherein the at least one similarity measure is utilized to determine a set of high similarity embeddings group associated with the classification of the set of embeddings.

10. The system of claim 9, wherein the clustering engine is utilized to form a set of high similarity feature groups from at least the set of high similarity embeddings group.

11. The system of claim 10 wherein a search space group rule is determined based on the high similarity feature groups.

12. The system of claim 11 wherein the search space group rule is utilized to eliminate at least one entity record from the plurality of entity record datasets.

13. The system of claim 12 wherein the plurality of entity record datasets are merged.

14. The system of claim 10 wherein the merge module determines an entity merge based on the features of the candidate entity record and at least the set of high similarity feature groups.

15. At least one non-transient computer-readable storage medium having encoded thereon software instructions that, when executed by at least one processor, cause the at least one processor to perform steps to:

retrieve, by at least one processor, a plurality of entity record datasets associated with one more entities, wherein each entity record dataset comprises at least one thousand data elements;

utilize, by the at least one processor, a computer-based merge module to resolve a candidate entity record from a plurality of entity record datasets;

wherein the computer-based merge module is configured to utilize at least one trained language learning model to determine a set of embeddings for the plurality of entity record datasets;

determine, by the at least one processor, a classification of the set of embeddings based on at least one similarity measure;

wherein the at least one similarity measure is utilized to determine:

a set of low similarity embeddings associated with the classification of the embeddings;

utilize, by the at least one processor, a clustering engine to form a set of low similarity feature groups from at least the set of low similarity embeddings group;

determine, by the at least one processor, at least one search space group rule based on the low similarity feature groups, wherein the clustering engine determines the at least one search space group rule by identifying one or more features of the set of low similarity feature groups and applying a threshold to a distance, determined using a vector based measure, between features of the low similarity feature groups;

utilize, by the at least one processor, the search space group rule to eliminate at least one entity record from the plurality of entity record datasets by applying the search space group rule to the plurality of entity record datasets to eliminate the at least one entity record that includes the identified one or more features of the set of low similarity feature groups;

merge, by the at least one processor, the plurality of entity record datasets.

16. The at least one computer-readable storage medium of claim 15, wherein the at least one similarity measure is utilized to determine a set of high similarity embeddings group associated with the classification of the set of embeddings.

17. The at least one computer-readable storage medium of claim 16, wherein the clustering engine is utilized to form a set of high similarity feature groups from at least the set of high similarity embeddings group.

18. The at least one computer-readable storage medium of claim 17, wherein a search space group rule is determined based on the high similarity feature groups.

19. The at least one computer-readable storage medium of claim 18, wherein the search space group rule is utilized to eliminate at least one entity record from the plurality of entity record datasets.

20. The at least one computer-readable storage medium of claim 19, wherein the plurality of entity record datasets are merged.

* * * * *